United States Patent
Mori

(10) Patent No.: US 12,422,543 B2
(45) Date of Patent: Sep. 23, 2025

(54) SECURITY INSPECTION SYSTEM AND SECURITY INSPECTION METHOD

(71) Applicant: KABUSHIKI KAISHA TOSHIBA, Tokyo (JP)

(72) Inventor: Hiroki Mori, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 282 days.

(21) Appl. No.: 18/184,133

(22) Filed: Mar. 15, 2023

(65) Prior Publication Data

US 2024/0094383 A1   Mar. 21, 2024

(30) Foreign Application Priority Data

Sep. 20, 2022   (JP) ................................. 2022-149482

(51) Int. Cl.
| | |
|---|---|
| *G01S 13/88* | (2006.01) |
| *G01S 13/89* | (2006.01) |
| *G01V 3/12* | (2006.01) |
| *G01V 8/00* | (2006.01) |

(52) U.S. Cl.
CPC ............ *G01S 13/887* (2013.01); *G01S 13/89* (2013.01); *G01V 3/12* (2013.01); *G01V 8/005* (2013.01)

(58) Field of Classification Search
CPC ......... G01S 13/887; G01S 13/89; G01V 3/12; G01V 8/005
See application file for complete search history.

(56) References Cited

U.S. PATENT DOCUMENTS

| | | | |
|---|---|---|---|
| 7,889,113 B2 | 2/2011 | Cardiasmenos et al. | |
| 7,889,224 B2 | 2/2011 | Hagiya et al. | |
| 9,824,570 B1* | 11/2017 | Skowronek | G01S 15/86 |
| 2016/0291148 A1 | 10/2016 | Ellenbogen et al. | |
| 2018/0181094 A1* | 6/2018 | Funk | H04L 67/12 |
| 2019/0327124 A1* | 10/2019 | Lai | G01S 5/017 |
| 2022/0057519 A1* | 2/2022 | Goldstein | G01S 17/88 |
| 2022/0228419 A1* | 7/2022 | Tiso | G08B 13/08 |
| 2023/0070772 A1* | 3/2023 | Bingham | G08B 19/005 |

FOREIGN PATENT DOCUMENTS

| | | |
|---|---|---|
| CN | 109799500 A | 5/2019 |
| EP | 2204783 A1 | 7/2010 |
| JP | H05166023 A | 7/1993 |
| JP | H0969174 A | 3/1997 |
| JP | 2002312812 A | 10/2002 |
| JP | 2007072848 A | 3/2007 |
| JP | 6844972 B2 | 3/2021 |
| JP | 2022011498 A | 1/2022 |
| TW | 201839662 A | 11/2018 |

* cited by examiner

Primary Examiner — Hugh Maupin
(74) Attorney, Agent, or Firm — Holtz, Holtz & Volek PC

(57) ABSTRACT

A security inspection system includes a determination device and a control device. The determination device performs a first determination regarding whether a target has a predetermined object. The control device controls a passage management device which performs a second determination regarding whether the target has been permitted to pass. The control device transmits a second signal to the determination device when receiving a first signal from the passage management device. The first signal indicates a start of the second determination with regards to the target. The determination device starts the first determination with regards to the target when receiving the second signal.

18 Claims, 10 Drawing Sheets

|  | Door control signal | Display control signal | Communication control signal (receiver) | Integrated information |
|---|---|---|---|---|
| First process | Open | Permitted to pass | None | Inspection target has been permitted to pass |
| Second process | Close | Not permitted to pass | Guard | Inspection target has dangerous object |
| Third process | Close | Not permitted to pass | Station employee | Inspection target has not been permitted to pass |
| Fourth process | Close | Not permitted to pass | Police officer | Inspection target has dangerous object and has not been permitted to pass |

F I G. 8

| User ID | Integration information | The number of first determinations (no passage right) | The number of second determinations (dangerous object possession) |
|---|---|---|---|
| 0001 | Inspection target has been permitted to pass | 0 | 0 |
| 0002 | Inspection target has dangerous object | 0 | 1 |
| 0003 | Inspection target has not been permitted to pass | 1 | 0 |
| 0004 | Inspection target has dangerous object and has not been permitted to pass | 1 | 1 |
| 0005 | Inspection target has been permitted to pass | 5 | 4 |
| 0006 | Inspection target has dangerous object | 1 | 5 |
| 0007 | Inspection target has not been permitted to pass | 2 | 5 |
| 0008 | Inspection target has dangerous object and has not been permitted to pass | 2 | 2 |
| ... | ... | ... | ... |

F I G. 9

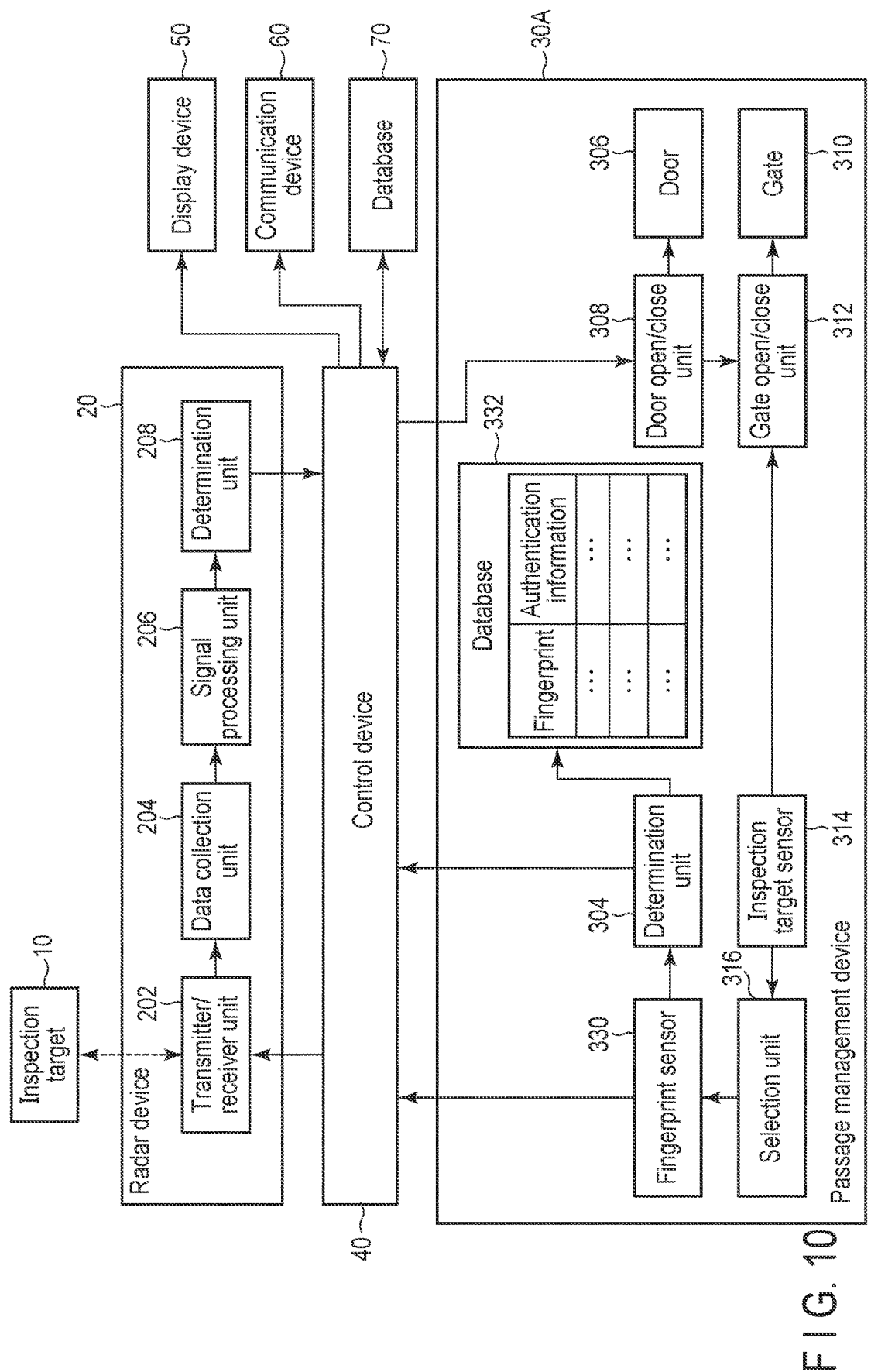
F I G. 10

SECURITY INSPECTION SYSTEM AND SECURITY INSPECTION METHOD

CROSS-REFERENCE TO RELATED APPLICATIONS

This application is based upon and claims the benefit of priority from Japanese Patent Application No. 2022-149482, filed Sep. 20, 2022, the entire contents of which are incorporated herein by reference.

FIELD

Embodiments described herein relate generally to a security inspection system and a security inspection method.

BACKGROUND

A security inspection system which determines whether or not an inspection target has a dangerous object has been developed. An example of the system uses an electromagnetic wave. A transmitter circuit transmits an electromagnetic wave to an inspection target from a transmit antenna. A receiver circuit receives a reflected wave from the inspection target by a receive antenna. The receiver circuit is connected to a signal processing circuit. The signal processing circuit processes the received signal to detect a dangerous object.

For example, the place in which this system is provided is the vicinity of the gate of a station, an amusement park, a concert hall, a building, etc., through which a large number of people pass. It is difficult to stop walking persons for inspection. Thus, a walk-through system which transmits an electromagnetic wave to people in motion has been developed.

The walk-through system does not need to stop an inspection target for inspection and can inspect a large number of inspection targets per unit time. In the walk-through system, a throughput of inspection is high. An inspection accuracy depends on the number of antennas. If the number of antennas is increased to enhance the inspection accuracy, an inspection target moves through a wide inspection range determined by the large number of antennas. Therefore, the position of the inspection target is changed during the inspection. The inspection accuracy may be degraded. To the contrary, if the number of antennas is decreased, an electromagnetic wave may not be transmitted to the entire body of the inspection target. Thus, the area of part of the inspection target may not be inspected.

BRIEF DESCRIPTION OF THE DRAWINGS

FIG. 8 is a chart for explaining an example of a first process, a second process, a third process, and a fourth process according to the first embodiment.

FIG. 9 is a chart for explaining an example of a database according to the first embodiment.

FIG. 10 is a block circuit diagram for explaining an example of a passage management device according to a second embodiment.

DETAILED DESCRIPTION

Figure 1:
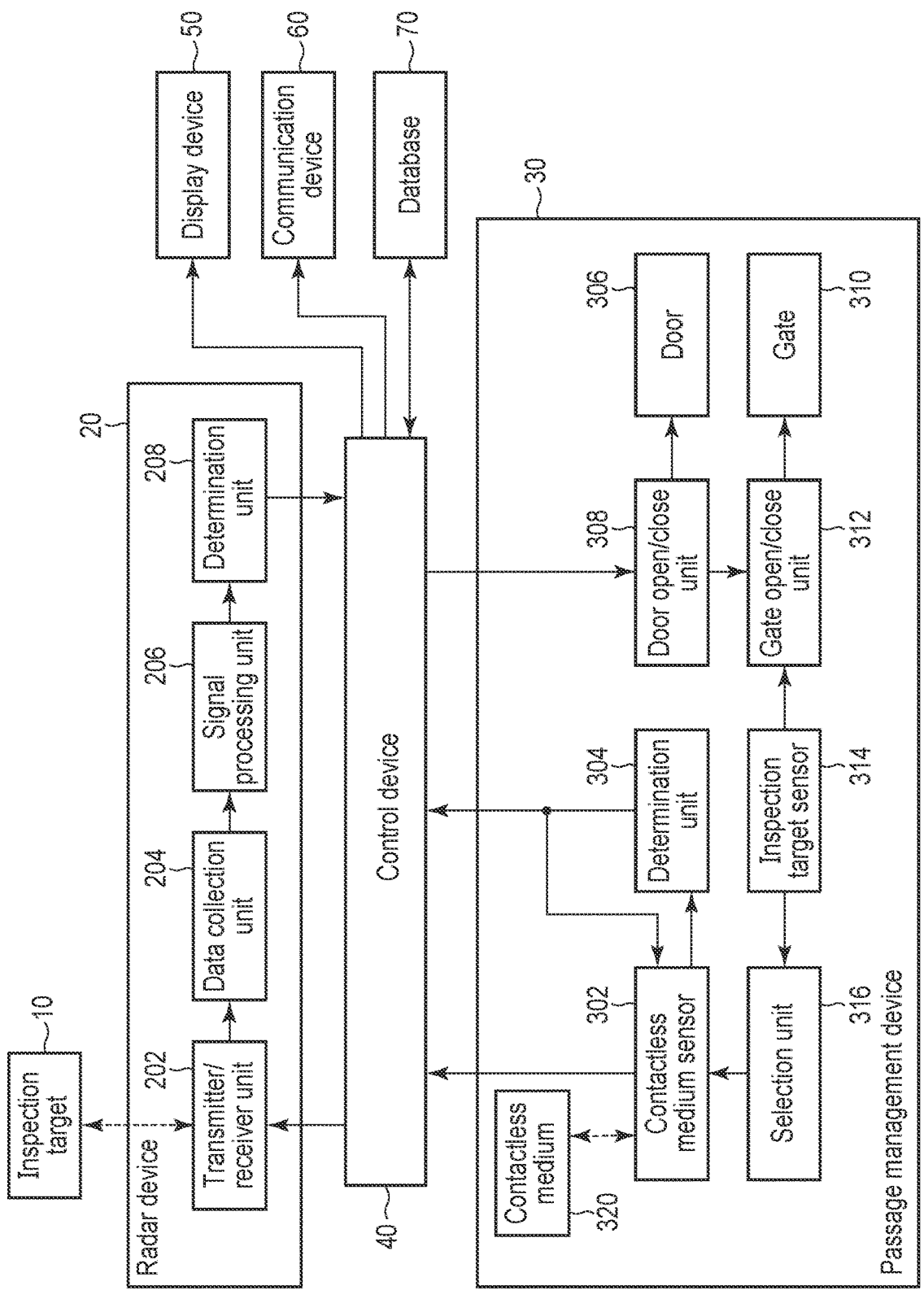
FIG. 1 is a diagram for explaining an example of a security inspection system according to a first embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a security inspection system includes a determination device and a control device. The determination device is configured to perform first determination, using an electromagnetic wave, regarding whether a target has a predetermined object. The control device is configured to control a passage management device which performs second determination regarding whether the target has been permitted to pass. The control device is configured to transmit a second signal to the determination device when receiving a first signal from the passage management device. The first signal indicates a start of the second determination. The determination device is configured to start the first determination when receiving the second signal.

First Embodiment

FIG. 1 is a diagram for explaining an example of a security inspection system according to a first embodiment. The security inspection system is provided at the entrance of a facility in which a large number of people gather, such as a station, a bus terminal, an airport, a shopping mall, a concert hall, an exhibition hall, and an office building. The security inspection system manages permission/non-permission of an inspection target to pass through the entrance gate of the facility or to enter the facility.

The security inspection system comprises a radar device 20, a passage management device 30, a control device 40, a display device 50, a communication device 60, and a database 70.

The radar device 20 is an inspection device which transmits an electromagnetic wave to a walking inspection target 10 and determines whether or not the inspection target 10 possess a predetermined object. An example of the predetermined object is a dangerous object which is not permitted to be carried into a facility. An example of the dangerous object is a metal object such as a gun and a knife, powder such as an explosive, and liquid such as gasoline. An example of the dangerous object may be unauthorized carry-on items such as powder of narcotics, etc., and a gold bar.

An example of the electromagnetic wave is an electromagnetic having a wavelength of 1 centimeter to 1 millimeter (with a frequency of 30 GHz to 300 GHz), which is also referred to as a millimeter wave. Another example of the electromagnetic wave is an electromagnetic wave having a wavelength of 1 millimeter to 100 micrometers (with a frequency of 300 GHz to 3 THz), which is also referred to as a submillimeter or terahertz wave.

The electromagnetic wave is reflected on the skin of the inspection target 10. The electromagnetic wave is also reflected on a metal object such as a gun and a knife. The reflectance of the metal object is higher than that of the skin. The intensity of the reflected wave of the metal object is higher than that of skin. The electromagnetic wave is absorbed by powder such as explosives. The reflectance of powder is lower than that of skin. The intensity of the reflected wave is based on the type of the substance of a point such as the skin, the metal object, powder, etc., on which the electromagnetic wave is reflected. The radar device 20 can detect the type of the substance of the point of reflection based on the intensity of the reflected wave and inspect a belonging of the inspection target 10. The radar device 20 may be replaced by another inspection device which can inspect the inspection target 10 regarding whether or not the inspection target 10 has a dangerous object by using an electromagnetic wave. An example of such an inspection device is an X-ray inspection device or a metal detector.

The radar device 20 comprises a transmitter/receiver unit 202, a data collection unit 204, a signal processing unit 206, and a determination unit 208. The transmitter/receiver unit 202 transmits an electromagnetic wave to the inspection target 10 and receives a reflected wave from the inspection target 10.

The transmitter/receiver unit 202 comprises a plurality of transmit antennas, a plurality of receive antennas, a transmitter circuit, and a receiver circuit. When the transmitter circuit receives a trigger signal from the control device 40, the transmitter circuit selects one of the transmit antennas, and transmits an electromagnetic wave to the inspection target 10 in a predetermined area from the selected transmit antenna. The electromagnetic wave transmitting range of the radar is called an inspection area. The control device 40 transmits a trigger signal when the inspection target 10 is located in the inspection area. Thus, the radar device transmits an electromagnetic wave when the inspection target 10 is located in the inspection area. The radar device 20 does not need to transmit an electromagnetic wave at all times, and thus, unnecessary power consumption can be prevented.

The transmitter/receiver unit 202 sequentially switches the transmit antenna which transmits an electromagnetic wave. The transmitter/receiver unit 202 transmits an electromagnetic wave from one transmit antenna, receives a reflected wave by a plurality of receive antennas simultaneously, and transmits a received signal to the data collection unit 204.

The data collection unit 204 performs an A/D conversion of the received signal and stores the received signal as a digital signal.

The data collection unit 204 transmits a digital received signal to the signal processing unit 206.

The signal processing unit 206 processes the digital received signal based on amplitude information and phase information and generates an image signal of the inspection target 10. The image signal includes information related to a belonging of the inspection target 10.

The signal processing unit 206 transmits the image signal to the determination unit 208. The determination unit 208 determines whether or not the inspection target 10 has a dangerous object by using the threshold determination of the image signal. The determination unit 208 may determine that the inspection target 10 has a dangerous object if the level of the image signal is higher or lower than a threshold. The determination unit 208 may determine whether or not the inspection target 10 has a dangerous object by using the machine learning or the deep learning of the image signal. The determination unit 208 transmits a first determination signal to the control device 40. The first determination signal indicates a first determination result regarding whether or not the inspection target 10 has a dangerous object to the control device 40.

The passage management device 30 comprises a contactless medium sensor 302, a determination unit 304, a door 306, a door open/close unit 308, a gate 310, a gate open/close unit 312, an inspection target sensor 314, and a selection unit 316.

The contactless medium sensor 302 detects approach of a contactless medium 320. An example of the contactless medium 320 is a contactless IC card or a smartphone comprising a short-range communication function. An example of the short-range communication is NFC (Near Field Communication) or Bluetooth (registered trademark). For the contactless medium 320, a medium which is generally used for the management of entrance, such as an employee ID card, and the management of passage regarding the ticket gates of stations can be used.

When the inspection target 10 comes to the position of the contactless medium sensor 302 while passing through the system, the inspection target 10 takes out the contactless medium 320 from a pocket or bag, etc., and holds the contactless medium 320 over the contactless medium sensor 302.

When the contactless medium sensor 302 detects the contactless medium 320, the contactless medium sensor 302 reads authentication information from the contactless medium 320, transmits the authentication information to the determination unit 304, and transmits a detection signal indicating that the contactless medium 320 has been detected to the control device 40.

When the contactless medium 320 is a smartphone, the authentication information is shown by a QR code (registered trademark) or a bar code displayed by an application. The authentication information includes identification information unique to the contactless medium, the name, address, sex, age and right information of the user, etc. The right information is information related to permission to pass of the user of the contactless medium 320.

In the case of a traffic-related security inspection system provided in the ticket gate of a station, bus terminal, etc., permission to pass is a ticket, a seat reservation ticket, etc., within the period of validity. When a person purchases a ticket, a seat reservation ticket, etc., right information including service use information (a traveling section, etc.)

the period of validity, seat information, seat purchase information, etc., is written to the contactless medium 320. The contactless medium 320 may store the result of the inspection by the security inspection system. Another example of the right information is the entrance ticket information of an amusement park or employee ID card information.

When the determination unit 304 receives the authentication information from the contactless medium 320, the determination unit 304 starts authentication regarding whether or not the inspection target 10 is an authorized user. In other words, the determination unit 304 starts determining whether or not the inspection target 10 has been permitted to pass this passage. For example, when the right information includes a right traveling zone, seat information, and seat purchase information, but the period of validity has expired, the determination unit 304 determines that the inspection target 10 has not been permitted to pass. The determination unit 304 transmits authentication information and a second determination signal to the control device 40. The second determination signal indicates a second determination result regarding whether or not the inspection target 10 has been permitted to pass. The determination unit 304 transmits the second determination signal to the contactless medium sensor 302 as well. The contactless medium sensor 302 may write the second determination result to the contactless medium 302.

The detection signal which is transmitted by the contactless medium sensor 302 to the control device 40 when the approach of the contactless medium 320 is detected also indicates that the determination unit 304 has started determination. In other words, when the control device 40 receives the detection signal, the control device 40 determines that the determination unit 304 has started determination.

When the control device 40 receives the detection signal, the control device 40 transmits a trigger signal to the transmitter/receiver unit 202. When the inspection target 10 holds the contactless medium 320 over the contactless medium sensor 302, the possibility that the passage speed is considerably decreased or the possibility that the inspection target 10 stops for a moment is high. Thus, a deviation is not generated for the position of the inspection target 10 during the transmitting/receiving period of an electromagnetic wave. In this way, the number of antennas can be increased so as to cover the entire area of the inspection target 10. Thus, it is possible to carry out an inspection with high accuracy. Further, the inspection target 10 does not need to stand still for inspection, and the throughput of inspection is high.

The contactless medium sensor 302 includes a plurality of sensor elements having different heights. The inspection target sensor 314 detects the height of the inspection target 10 who stands still in front of the gate 310 when the gate 310 is closed.

The selection unit 316 selects some of the sensor elements included in the contactless medium sensor 302, for example, selects one of the sensor elements, based on the output signal of the inspection target sensor 314.

The selection unit 316 may select a sensor element having a height close to the height of the shoulder of the inspection target 10. In this case, even if the inspection target 10 is close to the contactless medium sensor 302, the inspection target 10 has to raise his/her arm to hold the contactless medium 320 over the contactless medium sensor 302. Thus, the inspection target 10 cannot hold the contactless medium 320 over the contactless medium sensor 302 while carrying a dangerous object under his/her arm. The radar device 20 does not start transmitting of an electromagnetic wave unless the contactless medium sensor 302 detects the contactless medium 320. Thus, no inspection is started.

The gate 310 is provided at the entrance of the inspection area. The gate open/close unit 312 is connected to the gate 310. The gate open/close unit 312 receives signals from the door open/close unit 308 and the inspection target sensor 314. The gate 310 controls the entry of the inspection target 10 to the inspection area. Instead of providing the gate 310, the display device 50 may be provided at the entrance of the inspection area and display a text indicating permission of entry to the inspection area.

The door 306 is provided in the exit of the inspection area. The door open/close unit 308 is connected to the door 306. The door open/close unit 308 receives a door control signal from the control device 40. The door open/close unit 308 opens or closes the door 306 based on the door control signal. The door 306 controls the entry of the inspection target 10 to the facility or the passage through the entrance gate. Instead of providing the door 306, the display device 50 may be provided at the exit of the inspection area and display a text indicating permission of entry to the inspection area. An example of the door 306 is a flap door or a panel sliding door. The door 306 may be replaced by, for example, a rotary bar.

The control device 40 determines whether or not the passage of the inspection target 10 should be permitted based on the first determination signal and the second determination signal. The control device 40 transmits a door control signal based on the determination result to the door open/close unit 308. The control device 40 transmits a display control signal indicating the determination result to the display device 50. The display device 50 comprises a display which displays a text, and a speaker which outputs a determination result by sound or outputs warning. The control device 40 transmits a communication control signal based on the determination result to the communication device 60. The communication device 60 notifies at least one of a plurality of types of electronic devices of the determination result. A plurality of types of the electronic devices are managed by a plurality of managers at different public safety levels. In the case of a traffic-related security inspection system, the managers at different public safety levels are, for example, a guard, a station employee, and a police officer. The police officer has the highest public safety level. The guard has the lowest public safety level. Thus, the communication device 60 transmits the determination result to notification destinations corresponding to a plurality of levels (public safety levels) for the classification based on the first determination signal and the second determination signal. The level is high when the inspection target has a dangerous object. Further, the level is high when the inspection target has not been permitted to pass. The communication control signal indicates the manager of the notification destination. The control device 40 transmits integrated information based on the determination result to the database 70. The database 70 stores integrated information for the user ID of each inspection target.

The control device 40 may be realized by a CPU which executes a security inspection program or may be realized by a circuit such as an application specific integrated circuit (ASIC) or a field programmable gate array (FPGA).

FIG. 1 shows the radar device 20, the passage management device 30, and the control device 40 as separate devices. However, the configurations of the radar device 20, the passage management device 30, and the control device 40 are not limited to FIG. 1. The passage management device 30 may be provided in the same housing as the control device 40 such that the control device 40 includes the passage management device 30.

Figure 2:
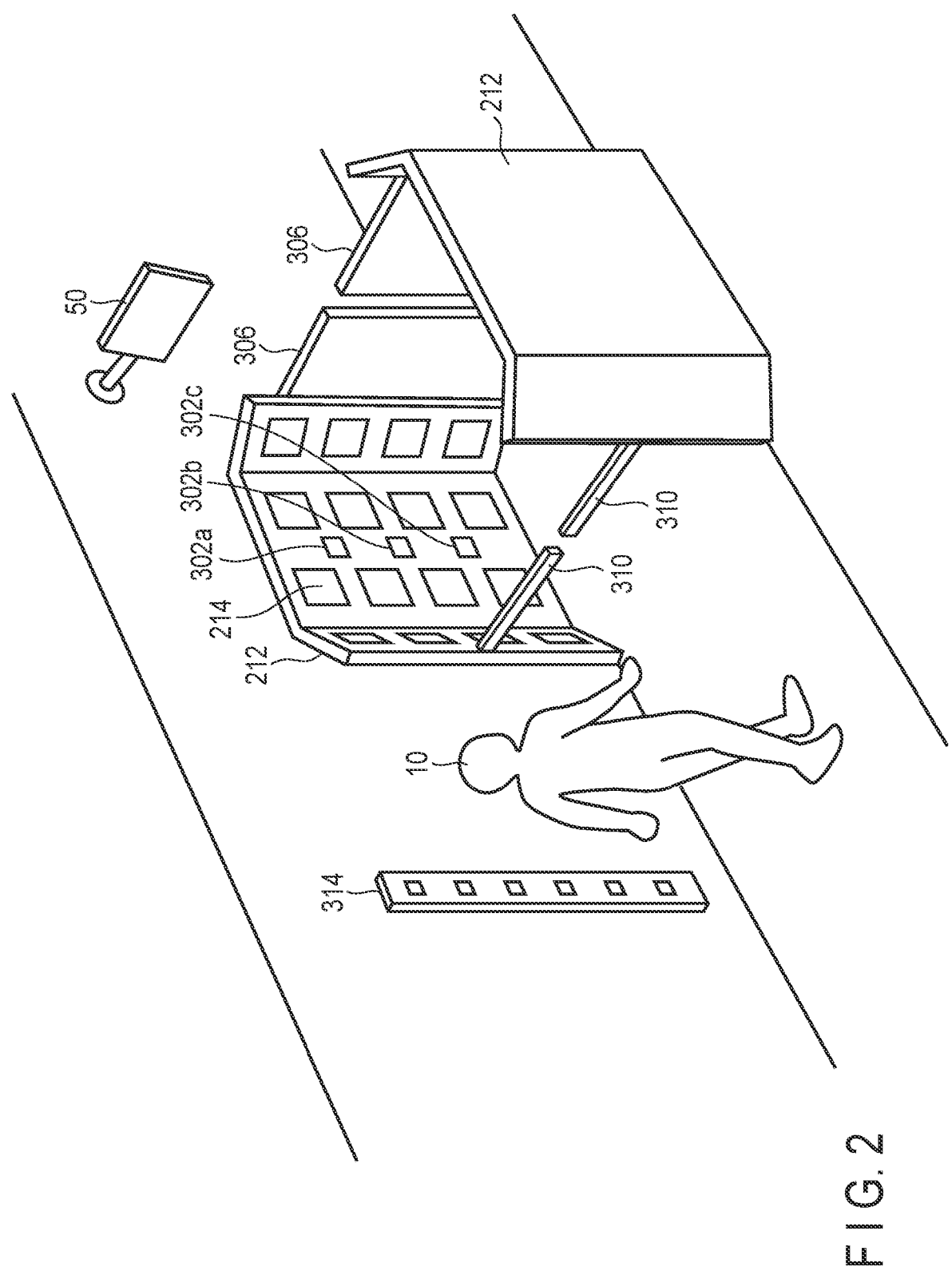
FIG. 2 is a perspective view for explaining an example of the security inspection system according to the first embodiment.

FIG. 2 is a perspective view for explaining an example of the layout of the security inspection system according to the first embodiment. Two antenna panels 212 are provided at the both sides of the entrance passage of the facility. The central portions of two antenna panels 212 are parallel to each other. Only one antenna panel 212 may be provided at a side of the entrance passage of the facility. Alternatively, only one antenna panel 212 may be provided at the ceiling or floor of the entrance passage of the facility.

The antenna panel 212 includes a large number of antennas 214 arranged in a two-dimensional array. An example of the shape of the antenna panel 212 is a rectangular shape. The side portion of the front side of the antenna panel 212 and the side portion of the back side are bent toward the center of the antenna panel 212. By this configuration, the electromagnetic wave from the antenna panel 212 is efficiently transmitted to the inspection target 10 located in the central portion of the inspection area.

For convenience sake, a small number of the antennas 214 are shown. In fact, a large of the antennas 214 are arrayed. The array of the antennas 214 is not limited to a two-dimensional array and may be linear. The antenna 214 may be a transmit/receive antenna or one of a transmit antenna and a receive antenna. When transmit antennas are linearly arrayed and receive antennas are linearly arrayed, the array direction of the transmit antennas may be different from the array direction of the receive antennas.

The antenna panel 212 comprises the contactless medium sensor 302 in the central portion. The contactless medium sensor 302 is provided in the transmitting range of the radar. The range to which the electromagnetic wave is transmitted by the antenna constituting the radar is defined as an electromagnetic wave transmitting range of the radar. When a plurality of antennas are provided, the electromagnetic wave transmitting range includes ranges to which the electromagnetic waves are transmitted by the respective antennas. When the two antenna panels 212 are provided so as to face each other, the electromagnetic wave transmitting range includes a range interposed between the antenna panels 212. The contactless medium sensor 302 includes a plurality of (here, three) sensor elements 302a, 302b, and 302c. The sensor elements 302a, 302b, and 302c are arrayed in a vertical line with different heights. Some of the sensor elements, for example, one of the sensor elements 302a, 302b, and 302c is selected based on the height of the inspection target 10. Only the selected sensor element 302a, 302b, or 302c operates and detects the contactless medium 320.

The gate 310 is provided on the front side of the antenna panels 212.

The inspection target sensor 314 is provided in front of the gate 310. The inspection target sensor 314 includes a plurality of sensor elements arranged in a vertical line with different heights. The inspection target sensor 314 detects the height of the inspection target 10 based on which sensor element detects the inspection target 10.

The door 306 are provided on the back side of the antenna panels 212.

The display device 50 is provided near the door 306 such that the inspection target 10 located in front of the door 306 can see the display device 50. The display device 50 displays a determination result. When the passage is not permitted, the inspection target 10 can know the reason of the determination.

Figure 3:
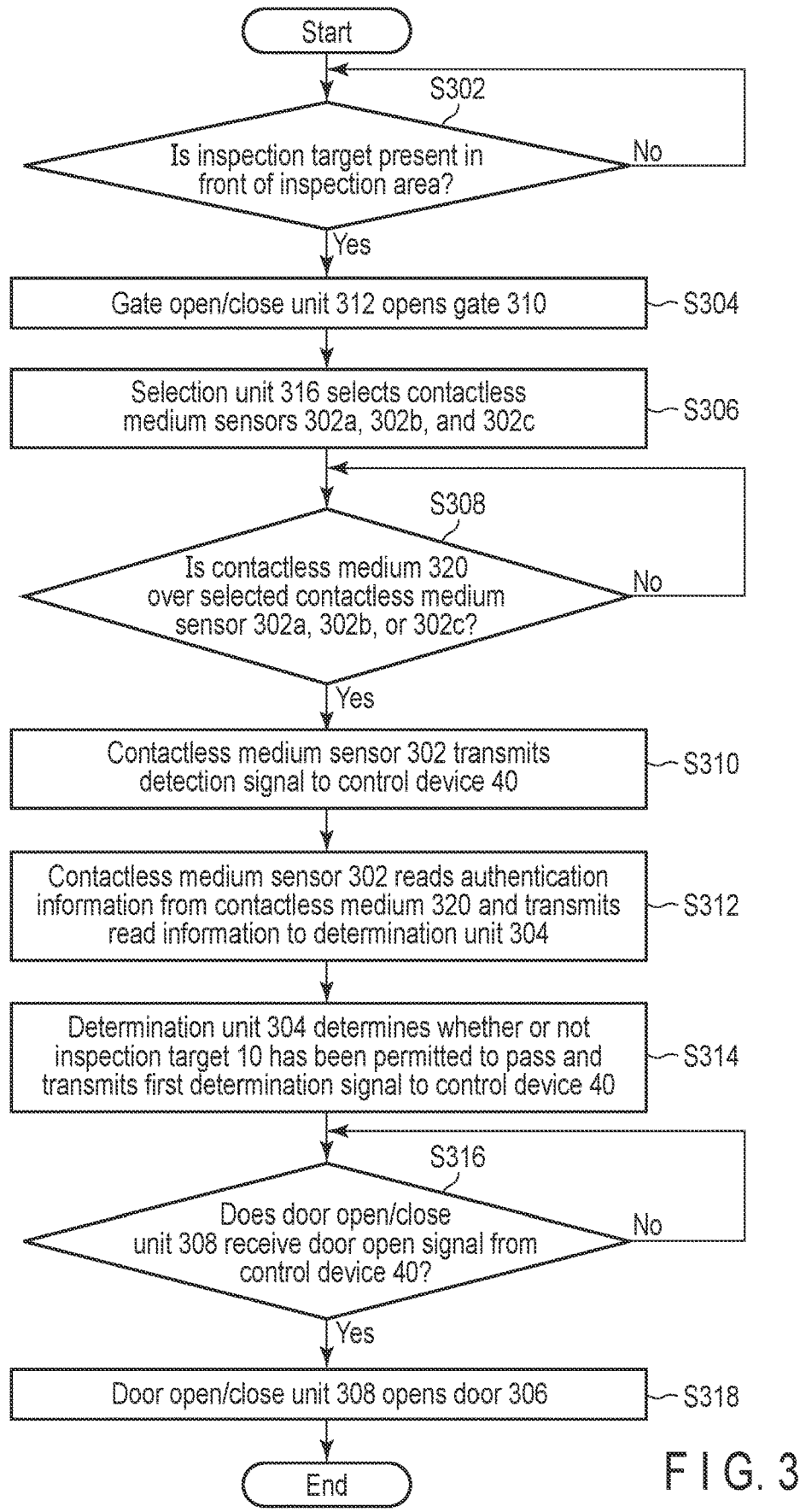
FIG. 3 is a flowchart for explaining an example of an operation of a passage management device according to the first embodiment.
Figure 4:
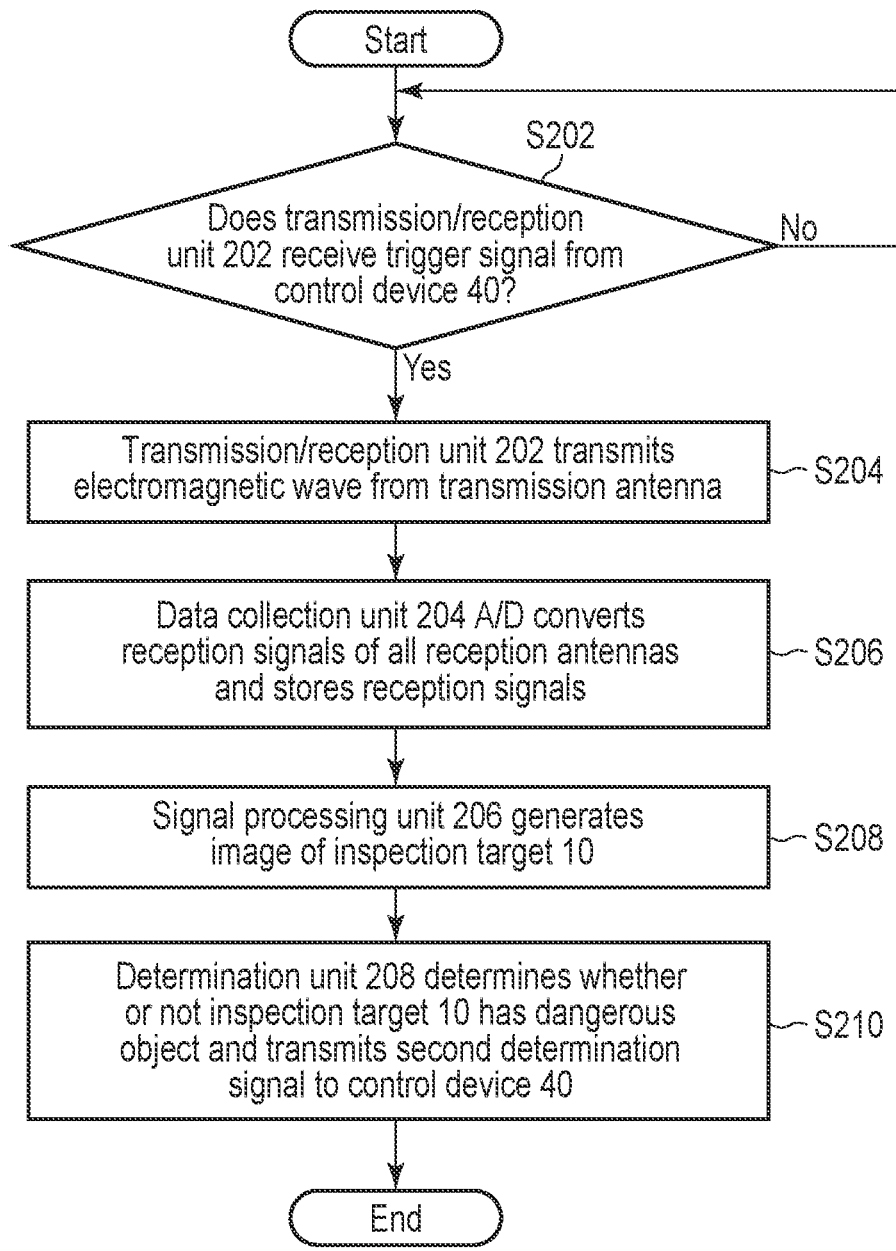
FIG. 4 is a flowchart for explaining an example of an operation of a radar device according to the first embodiment.
Figure 5:
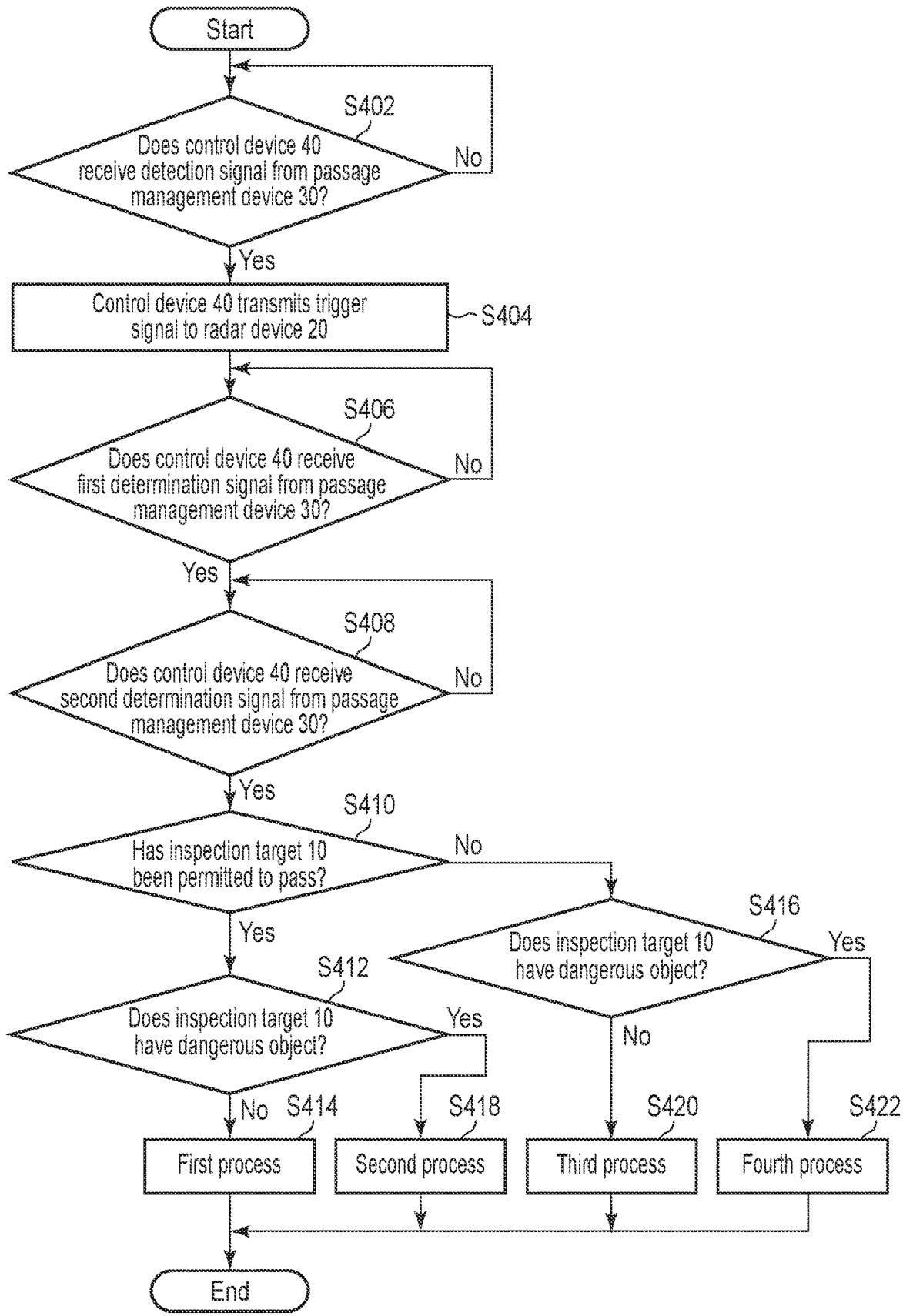
FIG. 5 is a flowchart for explaining an example of an operation of a control device according to the first embodiment.
Figure 6C:
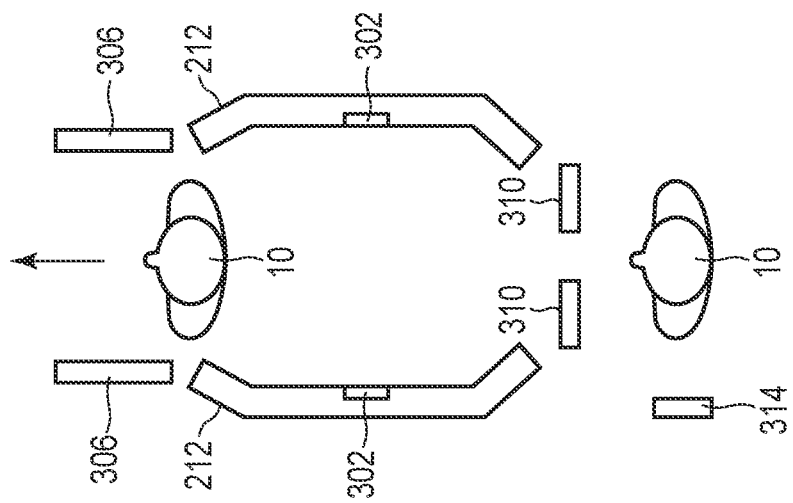
FIG. 6C is a plan view for explaining an example of the operation of the security inspection system according to the first embodiment.
Figure 6B:
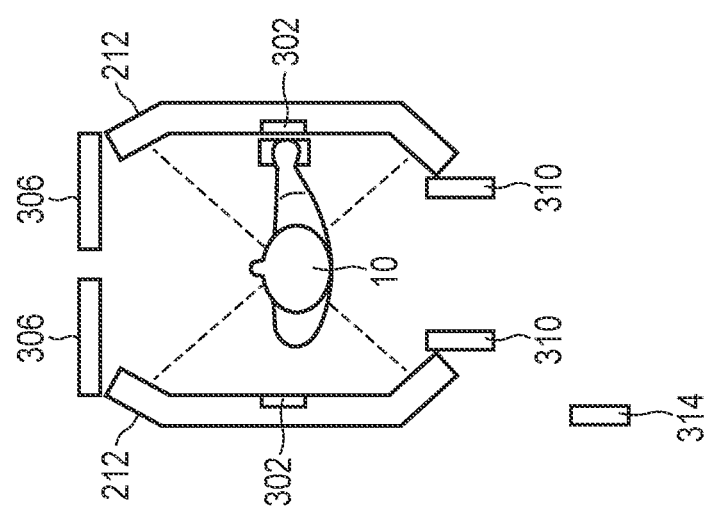
FIG. 6B is a plan view for explaining an example of the operation of the security inspection system according to the first embodiment.
Figure 6A:
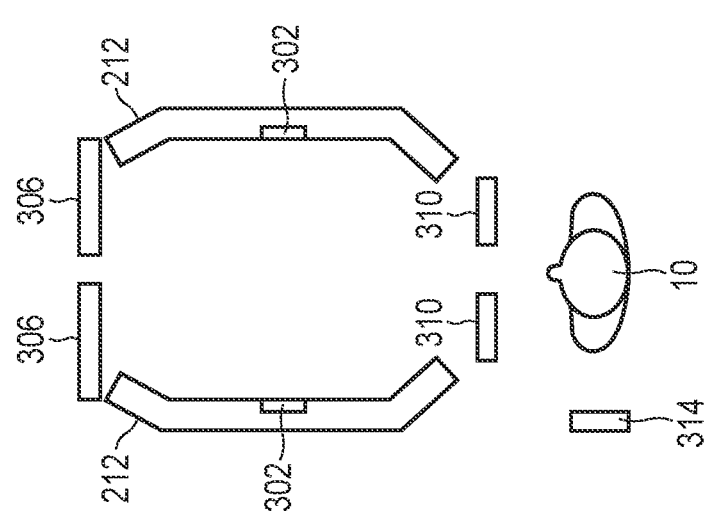
FIG. 6A is a plan view for explaining an example of an operation of the security inspection system according to the first embodiment.

FIG. 3 is a flowchart for explaining an example of an operation of the passage management device 30 according to the first embodiment. FIG. 4 is a flowchart for explaining an example of an operation of the radar device 20 according to the first embodiment. FIG. 5 is a flowchart for explaining an example of an operation of the control device 40 according to the first embodiment. FIGS. 6A, 6B, and 6C are plan views for explaining an example of an operation of the security inspection system according to the first embodiment.

In the passage management device 30, the gate 310 and the door 306 are closed at the time of powering on the system. The passage is formed such that the inspection target 10 undergoes the inspection of the security inspection system before entering the facility. When the inspection target 10 reaches the entrance of the inspection area, the inspection target 10 waits in front of the closed gate 310. FIG. 6A shows a state in which the inspection target 10 waits in front of the gate 310.

The inspection target sensor 314 determines whether or not the inspection target 10 is present in front of the inspection area (gate 310) (S302 in FIG. 3). When the inspection target sensor 314 detects that the inspection target 10 is present in front of the inspection area (S302; Yes), the gate open/close unit 312 opens the gate 310 (S304). The inspection target 10 enters the inspection area, as shown in FIG. 6B. The gate open/close unit 312 closes the gate 310 after the elapse of a certain period of time from the opening of the gate 310. Closing the gate 310 prevents a plurality of inspection targets 10 from being simultaneously present in the inspection area. The inspection target sensor 314 detects the presence of the inspection target 10 (S302) and also detects the height of the inspection target 10.

The selection unit 316 selects one of the contactless medium sensors 302a, 302b, and 302c based on the height of the inspection target 10 detected by the inspection target sensor 314 (S306). LED lamps may be provided for the contactless medium sensors 302a, 302b, and 302c. An LED lamp corresponding to the selected contactless medium sensor 302a, 302b, or 302c may be turned on. Alternatively, letters indicating the selected contactless medium sensor 302a, 302b, or 302c may be displayed in the display device 50. Moreover, a voice synthesis circuit may be provided such that the inspection target 10 is notified of the selected contactless medium sensor 302a, 302b, or 302c by sound such as the upper end, the center, or the lower end. Therefore, the inspection target 10 can know over which contactless medium sensor 302a, 302b, or 302c the contactless medium 320 should be held.

The inspection target 10 holds the contactless medium 320 over the selected contactless medium sensor 302a, 302b, or 302c. The contactless medium sensor 302 determines whether or not the contactless medium 320 is held over the selected contactless medium sensor 302a, 302b, or 302c (S308). When the contactless medium sensor 302 determines that the contactless medium 320 is held over the selected contactless medium sensor 302a, 302b, or 302c (S308; Yes), the contactless medium sensor 302 transmits a detection signal to the control device 40 (S310).

The contactless medium sensor 302 reads authentication information from the contactless medium 320 and transmits the authentication information to the determination unit 304 (S312).

The determination unit 304 starts determining whether or not the inspection target 10 has been permitted to pass based on the authentication information, and transmits the first determination signal indicating the first determination result to the control device 40 (S314).

The door open/close unit 308 determines whether or not a door control signal to open the door is received from the control device 40 (S316).

When the door open/close unit 308 receives the door control signal to open the door (S316; Yes), the door open/close unit 308 opens the door 306 (S318). FIG. 6C shows a state in which the door 306 is open (S318).

In the radar device 20, when the system is powered on, the transmitter/receiver unit 202 determines whether or not a trigger signal is received from the control device 40 (S202 in FIG. 4). When the transmitter/receiver unit 202 receives the trigger signal (S202; Yes), the transmitter/receiver unit 202 selects a transmit antenna and transmits an electromagnetic wave from the selected transmit antenna (S204). The reflected wave is received by all receive antennas. FIG. 6B shows a state in which a transmit antenna transmits an electromagnetic wave and the reflected wave is received by all receive antennas (S204). At this time, the inspection target 10 holds the contactless medium 320 over the contactless medium sensor 302 located in the central portion of the antenna panel 212. Thus, the electromagnetic wave is transmitted to the entire area of the inspection target 10.

The data collection unit 204 performs A/D conversion for the received signals of all receive antennas and stores the received signals as digital signals (S206). When the data collection of the reflected wave of the electromagnetic wave from one transmit antenna is finished, the transmitter/receiver unit 202 and the data collection unit 204 select another transmit antenna and repeats the processes of S204 and S206 until all transmit antennas transmit an electromagnetic wave.

The signal processing unit 206 processes the received digital signal and generates an image signal of the inspection target 10 (S208).

The determination unit 208 determines, based the image signal, whether or not the inspection target 10 has a dangerous object and transmits the second determination signal indicating the second determination result to the control device 40 (S210).

When the system is powered on, the control device 40 determines whether or not a detection signal is received from the passage management device 30 (S402 in FIG. 5). When the control device 40 receives the detection signal (S402; Yes), the control device 40 transmits a trigger signal to the radar device 20 (S404).

The control device 40 determines whether or not the first determination signal is received from the passage management device 30 (S406).

When the control device 40 receives the first determination signal (S406; Yes), the control device 40 determines whether or not the second determination signal is received from the radar device 20 (S408).

When the control device 40 receives the second determination signal (S408; Yes), the control device 40 determines, based on the first determination signal and the second determination signal, whether or not the passage of the inspection target 10 should be permitted.

The order of the determination of the receiving of the first determination signal (S406) and the determination of the receiving of the second determination signal (S408) may be the reverse order of FIG. 5.

The control device 40 determines, based on the first determination signal, whether or not the inspection target 10 has been permitted to pass (S410).

When the control device 40 determines that the inspection target 10 has been permitted to pass (S410; Yes), the control device 40 determines, based on the second determination signal, whether or not the inspection target 10 has a dangerous object (S412).

When the control device 40 determines that the inspection target 10 does not possess any dangerous object (S412; No), the control device 40 performs a first process (S414).

When the control device 40 determines that the inspection target 10 has a dangerous object (S412; Yes), the control device 40 performs a second process (S418).

When the control device 40 determines that the inspection target 10 has not been permitted to pass (S410; No), the control device 40 determines, based on the second determination signal, whether or not the inspection target 10 has a dangerous object (S416).

When the control device 40 determines that the inspection target 10 does not possess any dangerous object (S416; No), the control device 40 performs a third process (S420).

When the control device 40 determines that the inspection target 10 has a dangerous object (S416; Yes), the control device 40 performs a fourth process (S418).

In the above description, the determination based on the first determination signal (S410) is first performed, and then, the determination based on the second determination signal (S412 and S416) is performed. However, the determinations may be performed in the reverse order. In other words, the determination based on the second determination signal may be first performed, and then, the determination based on the first determination signal may be performed.

Figure 7:
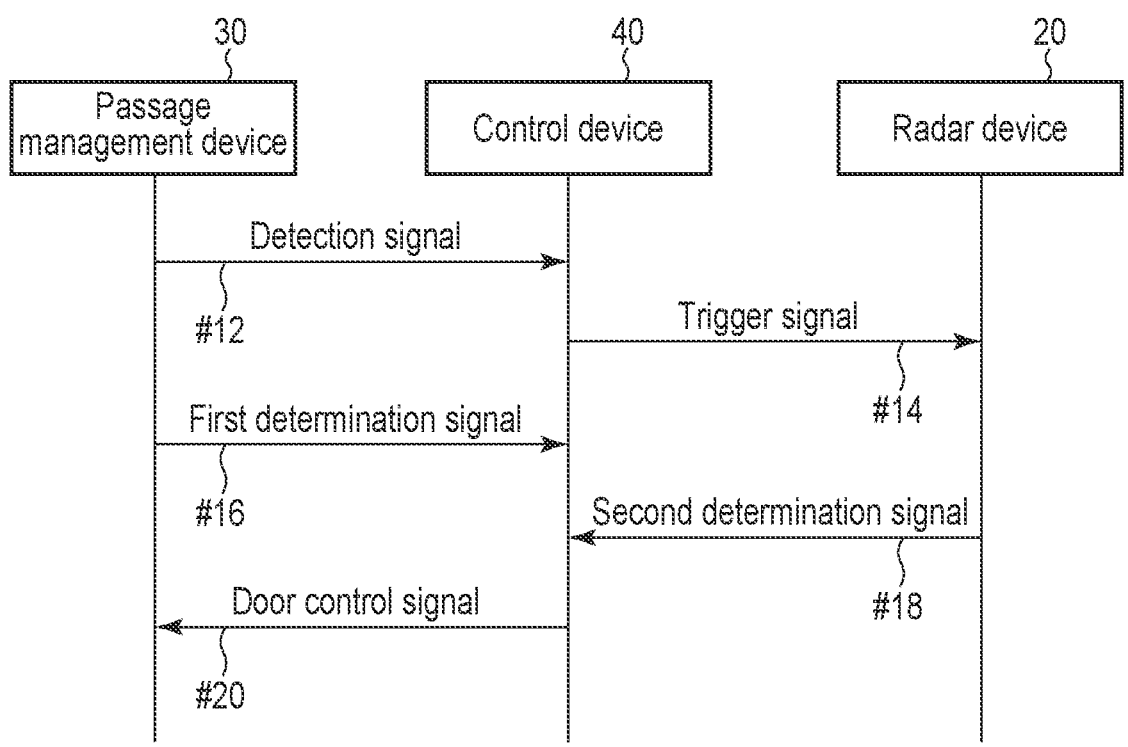
FIG. 7 is a sequence chart for explaining an example of relationship of the passage management device, the control device, and the radar device according to the first embodiment.

FIG. 7 is a sequence chart for explaining an example of the relationship of the operation of the passage management device 30, the control device 40, and the radar device 20 according to the first embodiment.

The passage management device 30 transmits the detection signal to the control device 40 (operation #12). The operation #12 corresponds to an operation of S310 (FIG. 3) and an operation of S402 (FIG. 5).

The control device 40 transmits the trigger signal to the radar device 20 based on the receiving of the detection signal (operation #14). The operation #14 corresponds to an operation of S202 (FIG. 4) and an operation of S404 (FIG. 5).

The passage management device 30 transmits the first determination signal to the control device 40 (operation #16). The operation #16 corresponds to an operation of S314 (FIG. 3) and an operation of S406 (FIG. 5).

The radar device 20 transmits the second determination signal to the control device 40 (operation #18). The operation #18 corresponds to an operation of S210 (FIG. 4) and an operation of S408 (FIG. 5).

The operations #16 and #18 may be performed in the reverse order of FIG. 7.

The control device 40 transmits the door control signal to the passage management device 30 (operation #20). The operation #20 corresponds to an operation of S414 (FIG. 4) and an operation of S316 (FIG. 3).

FIG. 8 is a chart for explaining an example the first process (S414), the second process (S418), the third process (S420), and the fourth process (S422) according to the first embodiment. FIG. 9 is a chart for explaining an example of data stored in the database 70 according to the first embodiment. The database 70 stores integrated information, the accumulation value of the number of determinations of "not permitted to pass" (which may be hereinafter referred to as the number of first determinations) and the accumulation value of the number of determinations of "dangerous object possession" (which may be hereinafter referred to as the number of second determinations) for each user ID. The door control signal of FIG. 8 is a passage management signal. When the inspection target 10 has not been permitted to pass, the door control signal indicates that the passage of the inspection target 10 is not permitted. When the inspection target 10 has been permitted to pass and does not possess any dangerous object, the door control signal indicates that the passage of the inspection target 10 is permitted. When the inspection target 10 has been permitted to pass and has a dangerous object, the door control signal may indicate that the passage of the inspection target 10 is not permitted. Alternatively, when the inspection target 10 has been permitted to pass and has a dangerous object, the door control signal may indicate that the passage of the inspection target 10 is permitted and reports the possession of the dangerous object.

In the first process (S414) which is performed when the inspection target 10 has been permitted to pass and does not possess any dangerous object, the control device 40 transmits a door control signal to open the door to the door open/close unit 308, transmits a display control signal for displaying a text indicating the permission of the passage to the display device 50, transmits a communication control signal indicating that the notification is unnecessary to the communication device 60, and transmits integrated information indicating that the inspection target 10 has been permitted to pass to the database 70. The database 70 stores the integrated information, the number of first determinations, and the number of second determinations for each user ID.

It is assumed that the user ID of the inspection target 10 of the first process is 0001 (hereinafter, simply referred to as user 0001) and user 0001 has not been inspected by the security inspection system. The integrated information "inspection target has been permitted to pass", the number of first determinations "0", and the number of second determinations "0" are written to the database 70 in relation to user 0001.

In the second process (S418) which is performed when the inspection target 10 has been permitted to pass and has a dangerous object, the control device 40 transmits a door control signal to close the door to the door open/close unit 308, transmits a display control signal for displaying a text indicating that the passage is not permitted to the display device 50, transmits a communication control signal indicating that a guard should be notified that the inspection target 10 has a dangerous object to the communication device 60, and transmits integrated information indicating that the inspection target 10 has a dangerous object to the database 70. The guard is not limited to a human and may be a robot. The database 70 stores integrated information, the number of first determinations, and the number of second determinations for each user ID.

It is assumed that the inspection target 10 of the second process is user 0002 and user 0002 has not been inspected by the security inspection system. The integrated information "inspection target has dangerous object", the number of first determinations "0", and the number of second determinations "1" are written to the database 70 in relation to user 0002.

Alternately, it is assumed that the inspection target 10 of the second process is user 0006 and user 0006 has been inspected by the security inspection system. The number of first determinations for user 0006 stored in the database 70 is assumed to be "1". The number of second determinations for user 0006 stored in the database 70 is assumed to be "4". According to the second process, the integrated information "inspection target has dangerous object", the number of first determinations "1", and the number of second determinations "5" (=4+1) are written to the database 70 in relation to user 0006. The data in the database 70 is updated.

The control device 40 may change the content of the second process based on the comparison between the number of first determinations (the number before updating or the number after the updating) and a first threshold and the comparison between the number of second determinations (the number before updating or the number after the updating) and a second threshold.

For example, the second threshold of the number of second determinations of attempting to ride with a dangerous object is assumed to be 5. When the number of second determinations of user 0006 becomes 5, the control device 40 may change the notification destination from a guard to a station employee or a police officer. The public safety level of a guard is lower than that of a station employee and a police officer. A guard cannot question the inspection target 10. A guard cannot place the inspection target 10 under restraint. A guard can only keep a close eye on the inspection target 10. A police officer can question the inspection target 10 and can also place the inspection target 10 under restraint.

In the second process, the gate 310 may be closed to trap the inspection target 10 in the inspection area.

Alternatively, the display content of the display device 50 may not be a text which simply indicates whether or not the passage is permitted, and may be changed to a detailed text which includes integrated information and the number of determinations. To easily change the processing content, the content of the second process may be changed to the content of the third process.

In the third process (S420) which is performed when the inspection target 10 has not been permitted to pass and has any dangerous object, the control device 40 transmits a door control signal to close the door to the door open/close unit 308, transmits a display control signal for displaying a text indicating that the passage is not permitted to the display device 50, transmits a communication control signal indicating that a station employee should be notified that the inspection target 10 has not been permitted to pass to the communication device 60, and transmits integrated information indicating that the inspection target 10 has not been permitted to pass (for example, the inspection target 10 attempted to illegally ride) to the database 70.

It is assumed that the inspection target 10 of the third process is user 0003 and user 0003 has not been inspected by the security inspection system. The integrated information "inspection target has not been permitted to pass", the number of first determinations "1", and the number of second determinations "0" are written to the database 70 in relation to user 0003.

Alternately, it is assumed that the inspection target 10 of the third process is user 0007 and user 0007 has been inspected by the security inspection system. The number of first determinations for user 0007 stored in the database 70 is assumed to be "1". The number of second determinations for user 0007 stored in the database 70 is assumed to be "5". According to the third process, the integrated information "inspection target has not been permitted to pass", the number of first determinations "2" (=1+1)", and the number of second determinations "5" are written to the database 70 in relation to user 0007. The data in the database 70 is updated.

The control device 40 may change the content of the third process based on the number of first determinations and the number of second determinations.

For example, in the third process, the gate 310 may be closed to trap the inspection target 10 in the inspection area.

For example, the first threshold of the number of first determinations of attempting to illegally ride without being permitted to pass is assumed to be 2. When the number of first determinations of user 0007 becomes 2, the control device 40 may change the notification destination from a station employee to a police officer.

Alternatively, the display content of the display device 50 may not be a text which simply indicates whether or not the passage is permitted, and may be changed to a detailed text which includes integrated information and the number of determinations. To easily change the processing content, the content of the third process may be changed to the content of the fourth process.

In the fourth process (S422) which is performed when the inspection target 10 has not been permitted to pass and has a dangerous object, the control device 40 transmits a door control signal to close the door to the door open/close unit 308, transmits a display control signal for displaying a text indicating that the passage is not permitted to the display device 50, transmits a communication control signal indicating that a police officer should be notified that the inspection target 10 has not been permitted to pass and has a dangerous object to the communication device 60, and transmits integrated information indicating that the inspection target 10 has not been permitted to pass and has a dangerous object to the database 70.

It is assumed that the inspection target 10 of the fourth process is user 0004 and user 0004 has not been inspected by the security inspection system. The integrated information "inspection target has dangerous object and has not been permitted to pass", the number of first determinations "1", and the number of second determinations "1" are written to the database 70 in relation to user 0004.

Alternately, it is assumed that the inspection target 10 of the fourth process is user 0008 and user 0008 has been inspected by the security inspection system. The number of first determinations for user 0008 stored in the database 70 is assumed to be "1". The number of second determinations for user 0008 stored in the database 70 is assumed to be "1". According to the fourth process, the integrated information "inspection target has dangerous object and has not been permitted to pass", the number of first determinations "2" (=1+1), and the number of second determinations "2" (=1+1) are written to the database 70 in relation to user 0008. The data in the database 70 is updated.

The control device 40 may change the content of the fourth process based on the number of first determinations and the number of second determinations.

For example, in the fourth process, the gate 310 may be closed to trap the inspection target 10 in the inspection area.

It should be noted that the processing content shown in FIG. 8 is merely an example and is not limited to this example. For example, in the second process or the fourth process, the passage may be permitted by issuing a door control signal to open the door. In this case, a guard may guide the inspection target 10 who entered the facility to a specific place and performs an inspection regarding the possession of a dangerous object. Alternately, an operator monitor the inspection target 10 in the facility by a different method to prevent a dangerous action. In the third process in the case of a transportation system, similarly, the passage may be permitted by issuing a door control signal to open the door. In this case, a crew member may confirm whether or not the inspection target 10 has been permitted to pass in the train or plane.

In the first process to the fourth process, although the database of FIG. 9 is updated as described above, a door control signal may instruct "open the door" and the message "passage is permitted" may be displayed in the display device 50. By informing the notification destination of integrated information, the inspection target 10 may be stopped for some questions or questioned in a specific place in the notification destination.

According to the security inspection system of the first embodiment, the control device 40 integrally controls the passage management device 30 and the radar device 20. The inspection target 10 stops for a moment or decreases the passage speed when the passage management device 30 determines whether or not the inspection target 10 has been permitted to pass. The passage management device 30 notifies the control device 40 of this time point. The control device 40 causes the radar device 20 to transmit an electromagnetic wave and start inspection at this time point. Therefore, the position of the inspection target 10 is not changed during the transmitting/receiving period of the electromagnetic wave. Thus, the degradation of the inspection accuracy is prevented. It is possible to carry out a security inspection with a high throughput and high accuracy.

The control device 40 determines how to respond by integrating the first determination result of the passage management device 30 regarding whether or not the inspection target 10 has been permitted to pass and the second determination result of the radar device 20 regarding whether or not the inspection target 10 has a dangerous object. Thus, the control device 40 can appropriately respond for the inspection target 10. For example, the control device 40 can appropriately and promptly determine whether the door 306 should be opened or closed, and which person should be notified of a determination result, specifically, a guard, a station employee, or a police officer.

Second Embodiment

FIG. 10 is a block circuit diagram for explaining an example of the circuit configuration of a passage management device 30A according to a second embodiment. In the first embodiment, the contactless medium 320 which stores the authentication information of the user is used. However, the contactless medium 320 is not used in the second embodiment. In the second embodiment, a database which stores authentication information in association with user information is used. In the second embodiment, user information is obtained from biometric information. An example of the biometric information is a fingerprint, a vein, an iris, voice, and a face. FIG. 10 shows an example in which a fingerprint is used as biometric information.

The passage management device 30A is different from the passage management device 30 in the following respects. A fingerprint sensor 330 is provided instead of the contactless medium sensor 302, and a database 332 is added.

In a manner similar to that of the contactless medium sensor 302, the fingerprint sensor 330 includes a plurality of sensor elements arrayed in a vertical line in the central portion of each antenna panel 212 and having different heights. The sensor element which operates is selected based on the height of the inspection target 10.

The database 332 stores fingerprint data and authentication information in association with each other. In the second embodiment, when the inspection target 10 has been permitted to pass, fingerprint data is written to the database 332 in association with authentication information.

The inspection target 10 who entered the inspection area stands still for a moment at the position of the fingerprint sensor 330 provided in the central portion of the inspection area and holds his/her finger over the fingerprint sensor 330. When the fingerprint sensor 330 detects a fingerprint, the fingerprint sensor 330 transmits a detection signal to the control device 40 and the radar device 20 starts inspection in a manner similar to that of the first embodiment.

When the fingerprint sensor 330 detects a fingerprint, the fingerprint sensor 330 transmits fingerprint data to the determination unit 304. The determination unit 304 reads authentication information from the database 332 based on the fingerprint data and determines whether or not the inspection target 10 has been permitted to pass in a manner similar to that of the first embodiment. The subsequent operations are the same as the first embodiment.

According to the security inspection system of the second embodiment, the passage management device 30A authenticates the inspection target 10 based on biometric information. In a manner similar to that of the first embodiment, the security inspection system determines whether or not the inspection target 10 has been permitted to pass and whether or not the inspection target 10 has a dangerous object. In a manner similar to that of the first embodiment, the control device 40 causes the radar device 20 to start inspection in association with the start of the authentication. Thus, effects similar to those of the first embodiment are obtained in the second embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A security inspection system comprising:
    a determination device configured to perform a first determination, using an electromagnetic wave, regarding whether a target has a predetermined object; and
    a control device configured to control a passage management device which performs a second determination regarding whether the target has been permitted to pass, wherein:
    the control device is configured to transmit a second signal to the determination device when receiving a first signal from the passage management device, the first signal indicating a start of the second determination with regards to the target; and
    the determination device is configured to start the first determination with regards to the target when receiving the second signal.

2. The security inspection system of claim 1, further comprising the passage management device,
    wherein:
    the passage management device comprises a sensor configured to detect approach of a contactless medium storing passage permission information; and
    the passage management device is configured to start the second determination when the sensor detects approach of the contactless medium, and transmit the first signal.

3. The security inspection system of claim 2, wherein:
    the determination device comprises a radar; and
    the sensor is provided in an electromagnetic wave transmitting range of the radar.

4. The security inspection system of claim 2, wherein:
    the sensor comprises a plurality of sensor elements vertically arrayed;
    a part of the sensor elements is selected based on a height of the target; and
    the selected part of the sensor elements is configured to detect approach of the contactless medium.

5. The security inspection system of claim 4, further comprising a height sensor configured to detect the height of the target,
    wherein the part of the sensor elements provided at a height corresponding to the height of the target is selected as the selected part of the sensor elements.

6. The security inspection system of claim 1, further comprising the passage management device,
    wherein:
    the passage management device comprises a sensor configured to detect biometric information of the target; and
    the passage management device is configured to start the second determination when the sensor detects the biometric information, and transmit the first signal.

7. The security inspection system of claim 6, wherein;
    the determination device comprises a radar; and
    the sensor is provided in an electromagnetic wave transmitting range of the radar.

8. The security inspection system of claim 6, wherein:
    the sensor comprises a plurality of sensor elements vertically arrayed;
    a part of the sensor elements is selected based on a height of the target; and
    the selected part of the sensor elements is configured to detect the biometric information.

9. The security inspection system of claim 1, wherein the control device is configured to transmit a passage management signal to the passage management device based on whether the target has been permitted to pass and whether the target has a predetermined object, the passage management signal indicating whether the target has been permitted to pass.

10. The security inspection system of claim 9, wherein:
    the passage management device further comprises a door or a bar in a passage of the target; and
    the passage management device is configured to open the door or the bar when the target has been permitted to pass and the target has no predetermined object.

11. The security inspection system of claim 9, wherein the control device is configured to write a result of the first determination and a result of the second determination into a database for each target.

12. The security inspection system of claim 11, wherein the control device is configured to:
    write the number of results of the first determination indicating that the target has not been permitted to pass and the number of results of the second determination indicating that the target has a predetermined object into the database for each target; and
    notify different destinations of the result of the first determination and the result of the second determination based on the number of results of the first determination and the number of results of the second determination.

13. The security inspection system of claim 1, further comprising:

a display device configured to display a message indicating whether the target has been permitted to pass based on whether the target has been permitted to pass and whether the target has a predetermined object.

14. The security inspection system of claim 1, further comprising:
a communication device configured to transmit first information indicating a result of the first determination and a result of the second determination to a predetermined device.

15. The security inspection system of claim 14, wherein the communication device is configured to transmit the first information to different devices based on the result of the first determination and the result of the second determination.

16. The security inspection system of claim 1, wherein the control device is configured to write a result of the first determination and a result of the second determination into a database for each target.

17. The security inspection system of claim 1, wherein the control device is configured to receive a third signal from the passage management device after transmitting the second signal, the third signal indicating a result of the second determination.

18. A security inspection method for a security inspection system comprising a determination device configured to perform a first determination, using an electromagnetic wave, regarding whether a target has a predetermined object, and a control device connected to a passage management device which performs a second determination regarding whether the target has been permitted to pass, the security inspection method comprising:
transmitting, by the control device, a second signal to the determination device when the control device receives a first signal from the passage management device, the first signal indicating a start of the second determination; and
starting, by the determination device, the first determination when the determination device receives the second signal.

* * * * *